J. A. FERGUSON.
STEAM HEATING APPARATUS.
APPLICATION FILED JAN. 26, 1914.
1,131,049.
Patented Mar. 9, 1915.
2 SHEETS—SHEET 2.
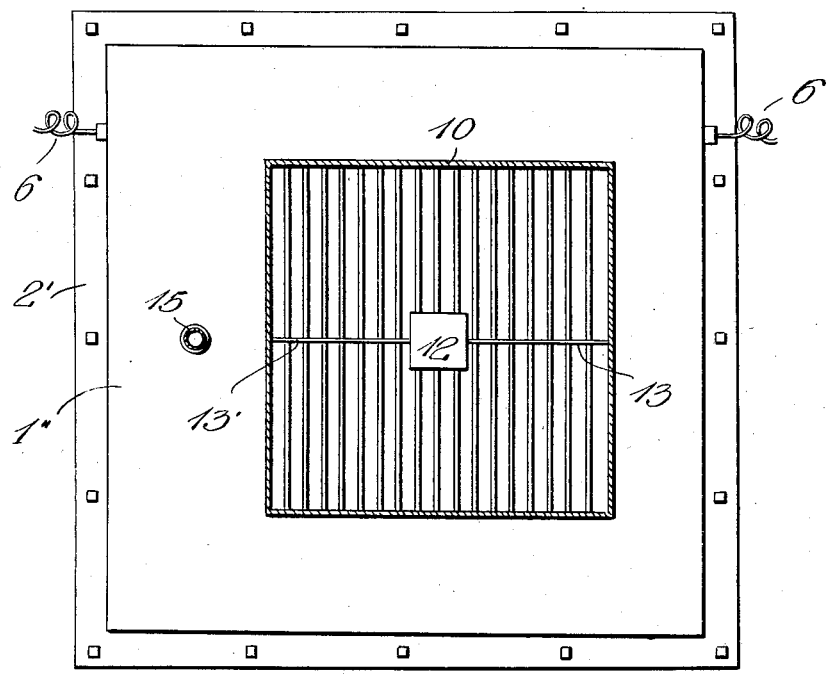
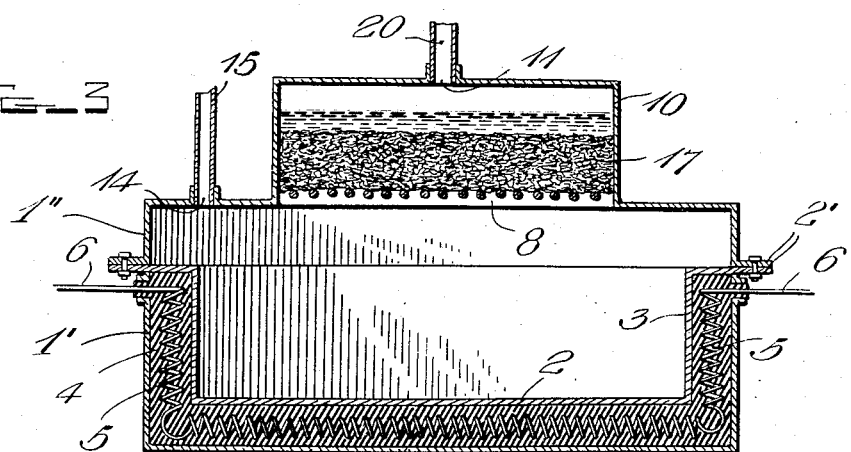
Witnesses
Inventor
J. A. Ferguson
By H. B. Willson & Co.
Attorneys

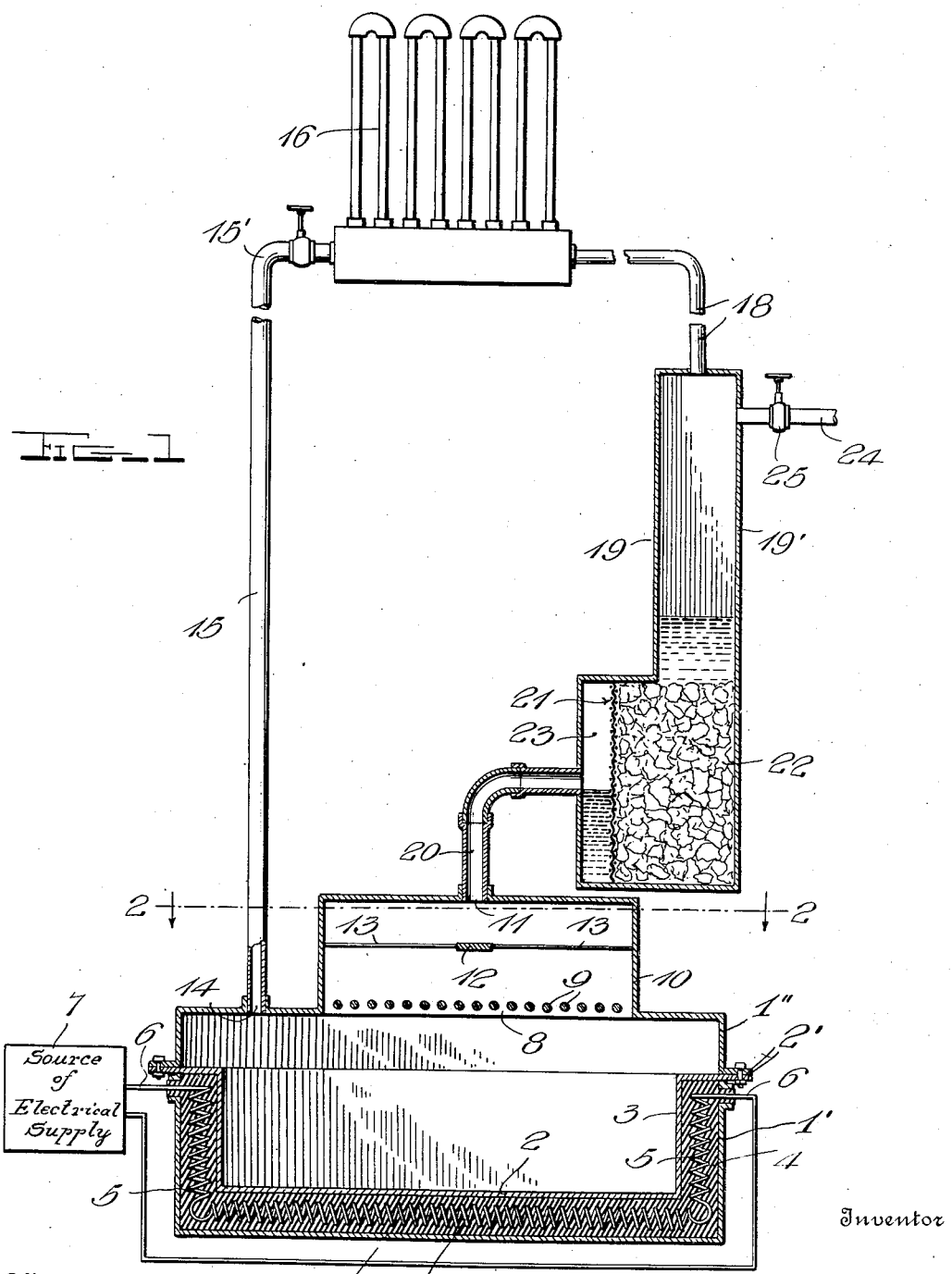

UNITED STATES PATENT OFFICE.

JAY A. FERGUSON, OF CHICAGO, ILLINOIS.

STEAM-HEATING APPARATUS.

1,131,049.  Specification of Letters Patent.  Patented Mar. 9, 1915.

Application filed January 26, 1914. Serial No. 814,425.

*To all whom it may concern:*

Be it known that I, JAY A. FERGUSON, a citizen of the United States, residing at Chicago, in the county of Cook and State of Illinois, have invented certain new and useful Improvements in Steam-Heating Apparatus; and I do declare the following to be a full, clear, and exact description of the invention, such as will enable others skilled in the art to which it appertains to make and use the same.

My invention relates to an appliance for electrically generating steam for heating or other purposes, and is especially applicable to the heating of buildings.

The objects of the same are to provide an electrical steam heating appliance which will maintain a continuous circulation of steam through the radiators; to utilize the condensed drain water for the purpose of converting the latter into steam for further circulation; prevent dirt and other foreign matter from entering the heating receptacle; and further to cause the drain water to be sprayed in small quantities or otherwise brought into contact with the heating element to instantaneously convert said water into steam.

Heretofore it has been customary in the art to have the electrical energy connected directly with the circulating means, but this form is objectionable in that it calls for expensive insulation as well as necessitating great precaution to prevent short circuiting of the current. These objectionable features I propose to eradicate by the utilization of my invention which consists collectively in a receptacle provided with an electrically heated element, on which the water conveyed in a filtered condition from my improved reservoir is sprayed; the spray is instantly converted into steam which passes to the various radiators from whence it is returned in a condensed condition to the supplemental tank, filtered, and again conveyed to the heating receptacle, where the process is repeated.

With these and other objects in view the invention consists in certain novel features of construction, and the combination and arrangement of parts as will be more fully described and claimed.

In the accompanying drawings in which similar parts are indicated by like characters—Figure 1 is a diagrammatic view of my improved heating appliance. Fig. 2 is a horizontal section on the line 2—2 of Fig. 1. Fig. 3 is a fragmentary sectional view showing a modified form of my heating receptacle.

Referring more particularly to the drawings, 1 represents the heating receptacle which is preferably in the form of an angular metallic tank composed of two sections 1' and 1" having the right angularly extending flanges 2' which are connected by rivets and the connection suitably packed to form a steam tight joint. I do not limit myself to this particular construction or conformation of the receptacle, however, as the latter could be readily formed of brick and made a unitary structure when desired. Within the receptacle 1, I dispose my heating element which comprises a metallic plate 2 having vertically extending flanges 3, the upper edges of the latter projecting to within a foot from the top of section 1". The plate 2 and its flanges 3 are offset from the bottom and sides of the receptacle 1 to form an intermediate space 4 to receive the heating coils 5 which are properly insulated from the tank 1 by any suitable insulating material and connected by conductors 6 with a source of electrical supply 7. Hence it will be seen that I am enabled to impart to the plate 2 and flange 3 any desired thermal efficiency so that the water dropping on said plate may be instantly converted into steam.

To facilitate the instantaneous conversion of the drainage into steam, I form an opening 8 in the forward portion of the top of the section 1" and provide the latter with a grating 9 or, if found to be more advantageous, I may entirely close said opening with some porous material such as clay, as indicated in Fig. 3. Over the opening 8 is placed a cap 10 having a small centrally arranged opening 11 formed in the top thereof to receive a lead pipe 20 extending from my improved reservoir which will be hereinafter described. An annular baffle plate 12 is supported immediately below the opening 11 within the cap 10 by the supporting rods 13 secured to the sides of said cap. From the foregoing it will be seen that as the water flowing from the reservoir enters the cap 10 through the opening 11 and strikes the baffle plate 12, it will be deflected to the grate 9 from whence it is thrown in the form of spray (by reason of the heated condition of the grate) into contact with the electrical heating element which immediately converts it into steam, the latter passing through the opening 14 formed in the rear of the receptacle 1 to the feed pipe 15 connected with pipe 15′ which leads to the various radiators 16. If on the other hand I close the opening 8 by some porous material 17, the cap 10 will then form an auxiliary receiver in which the water will collect, but owing to the porosity of the material 17, it will gradually seep through and falling on the heating element, will be converted into steam and conveyed from the receptacle in the manner described. After the steam has passed through the different radiators it is condensed and the drainage formed by condensation returned by the drain pipe 18 to the reservoir and while passing through the latter is filtered and then flows in purified condition to the cap 10 through the lead pipe 20.

My improved reservoir 19 which I have for convenience illustrated above and adjacent to the receptacle 1 may be situated in any desired location according to accommodation at hand. This reservoir comprises a main tank 19′ having an enlarged lower portion which is divided by the transversely extending fine wire screening 21 into supplemental reservoir 23 and filtering compartment 22. Into the latter I place an appropriate filtering substance such as charcoal so that the drainage flowing into the main tank 19′ from lead pipe 18 will enter the charcoal compartment 22 and after passing through the filtering material therein enter the supplemental reservoir 23 where it will accumulate until its level reaches that of the opening to pipe 20 when it will flow therethrough and pass into the cap 10 communicating with the opposite end thereof.

The tank 19′ is initially filled from the main water supply with which it is connected by the pipe 24 communicating with the upper end thereof. The pipe is provided with a valve 25 so that the supply to tank 19′ may be regulated as desired.

The operation of my improved heating appliance is as follows: The valve 25 is opened and sufficient water to nearly fill the same is permitted to enter, after which the valve is closed. The coils 5 are next placed in circuit which will heat the plates 2 and 3. The water in the meantime has passed through the filtering material in chamber 22, then in purified state to the supplemental reservoir 23 and, passing through pipe 20 to cap 10, is discharged against the baffle 13 and thrown on the grate 8 from whence it is sprayed (the heated condition of the grate causing the spraying effect) against heated plates 2 and 3. It is then immediately converted into steam and passes through opening 14 in the rear of receptacle 1 to the pipe 15, through which it passes to the different radiators. As the steam flows through the radiator condensation will take place and the drainage resulting therefrom is returned via the pipe 18 together with whatever steam may leave the last radiator, said steam being condensed in transit so that it is returned through said pipe 18 with the drainage. Now, after the latter enters the tank 19′ it is again filtered, and the process repeated.

By constructing both forms of the device as hereinbefore described, it will be seen that a heating chamber is provided whose upper end is of greater area in horizontal section, than its lower end, this increase in size being extremely advantageous for the purpose of super-heating the steam generated from the water dripping from the grate in the inlet opening of the heating chamber. It will be readily understood that such dripping of water, will cause the generated steam to be very damp, this being an undesirable feature as is well known. By the provision of the enlargement to the heating chamber, however, and the disposition of a portion of the heating coil directly beneath the bottom wall of said enlargement, the damp steam which rises into such enlarged upper end may be trapped adjacent the sides thereof or, in other words, may be trapped directly above the upper ends of the heating coils where it will be super-heated and dried before it is discharged through the pipe 15.

I am aware that numerous devices have heretofore been provided having upright heating chambers of the same horizontal area through their lengths, these chambers being designed for use in connection with a heating element which is disposed directly beneath the bottom. With these devices, however, damp steam is discharged from the heating chamber. Thus it will be seen that the greatest amount of efficiency is not gained from these devices, whereas, with my device, as above described, and as shown in the drawings, the highest efficiency possible is obtained, by the mere provision of the enlarged upper end of the heating chamber.

What is claimed as new is:

A steam generator comprising a heating casing including upper and lower sections, the former having an inlet and an outlet opening, a hood rising from the inlet opening and likewise having an inlet opening, an imperforate deflecting plate within the hood and located directly beneath the inlet opening therein, a transverse rod secured at its opposite ends to said hood whereby to support said deflecting plate, and a grate extending across the inlet opening of the heating casing.

In testimony whereof I have hereunto set my hand in presence of two subscribing witnesses.

JAY A. FERGUSON.

Witnesses:
H. H. CULP,
H. B. SNIDER.